(12) United States Patent
Gaudron

(10) Patent No.: US 7,040,850 B2
(45) Date of Patent: May 9, 2006

(54) FASTENER FOR USE WITH FRANGIBLE MATERIAL

(75) Inventor: Paul Gaudron, Stamford, CT (US)

(73) Assignee: Power Products III, L.L.C., New Rochelle, NY (US)

( * ) Notice: Subject to any disclaimer, the term of this patent is extended or adjusted under 35 U.S.C. 154(b) by 61 days.

(21) Appl. No.: 10/632,790

(22) Filed: Aug. 4, 2003

(65) Prior Publication Data

US 2005/0031434 A1 Feb. 10, 2005

(51) Int. Cl.
*F16B 35/04* (2006.01)
(52) U.S. Cl. ............... 411/412; 411/413; 411/308; 411/311; 411/424
(58) Field of Classification Search ............ 411/411, 411/412, 413, 308–311, 424
See application file for complete search history.

(56) References Cited

U.S. PATENT DOCUMENTS

| | | | | |
|---|---|---|---|---|
| 470,804 A | * | 3/1892 | Jones | 411/424 |
| 516,134 A | | 3/1894 | Stillwell | |
| 984,969 A | | 2/1911 | Reiniger | |
| 2,024,070 A | * | 12/1935 | Sharp | 470/16 |
| 2,314,897 A | * | 3/1943 | Purinton | 24/101 R |
| 2,419,555 A | * | 4/1947 | Fator | 411/387.3 |
| 3,861,269 A | * | 1/1975 | Laverty | 411/413 |
| 3,902,399 A | * | 9/1975 | Yotti | 411/414 |
| 3,911,781 A | * | 10/1975 | Bappert | 411/418 |
| 4,034,641 A | * | 7/1977 | Williams et al. | 411/387.7 |
| 4,144,795 A | * | 3/1979 | Gutshall | 411/413 |
| 4,544,313 A | | 10/1985 | Grossberndt | |
| 4,652,194 A | * | 3/1987 | Tajima et al. | 411/417 |
| 4,653,244 A | * | 3/1987 | Farrell | 52/745.21 |
| 4,892,429 A | | 1/1990 | Giannuzzi | |
| 4,893,974 A | * | 1/1990 | Fischer et al. | 411/82.1 |
| 5,059,077 A | | 10/1991 | Schmid | |
| 5,061,136 A | * | 10/1991 | Dixon et al. | 411/412 |
| 5,127,783 A | * | 7/1992 | Moghe et al. | 411/411 |
| 5,226,766 A | | 7/1993 | Lasner | |
| 5,252,016 A | | 10/1993 | Schmid et al. | |
| 5,562,377 A | * | 10/1996 | Giannuzzi et al. | 411/82 |
| 5,569,007 A | * | 10/1996 | Abraham | 411/82 |
| 5,647,709 A | * | 7/1997 | Hein et al. | 411/20 |
| 5,778,623 A | | 7/1998 | Powell | |
| 5,779,417 A | * | 7/1998 | Barth et al. | 411/412 |
| 5,957,646 A | | 9/1999 | Giannuzzi et al. | |
| 6,045,312 A | * | 4/2000 | Hsing | 411/412 |
| 6,250,866 B1 | * | 6/2001 | Devine | 411/387.4 |
| 6,264,677 B1 | | 7/2001 | Simon et al. | |
| 6,419,436 B1 | | 7/2002 | Gaudron | |
| 6,503,251 B1 | * | 1/2003 | Shadduck | 606/72 |

FOREIGN PATENT DOCUMENTS

| | | |
|---|---|---|
| DE | 298 12 947 U1 | 1/2000 |
| EP | 0 494 651 A1 | 7/1992 |
| EP | 1 167 781 A1 | 1/2002 |
| EP | 1 182 364 A3 | 8/2003 |
| GB | 1 583 480 | 1/1981 |
| GB | 2070996 A * | 9/1981 |

* cited by examiner

*Primary Examiner*—Katherine Mitchell
(74) *Attorney, Agent, or Firm*—Morgan, Lewis & Bockius

(57) ABSTRACT

A metal fastener for frangible material has a threaded shank, a head proximate one end of the shank and a tip at the opposite end. The fastener has a coarse pitch and relatively large ratio of major to minor diameters suited for securing the fastener into frangible material such as drywall or masonry.

9 Claims, 1 Drawing Sheet

FASTENER FOR USE WITH FRANGIBLE MATERIAL

The invention relates generally to a threaded fastener and in particular, a threaded fastener for use with frangible material.

BACKGROUND OF THE INVENTION

Screws have existed for many years and are based on the principle of the inclined plane providing a wedging action to force the head of the screw into the substrate. Different screws have been developed for different materials.

Fasteners used to secure structure to low-strength frangible material will usually require some type of supporting material for the fastener. In the case of, e.g., drywall, a metal or wooden stud is typically used. In the case of masonry, self-tapping screw-type fasteners can be securely held in a pre-bored concrete hole by a thread design suited for capturing material between the threading as the hole is tapped. One example of such a masonry fastener is U.S. Pat. No. 5,957,646 to Giannuzzi.

What is needed is a screw-type fastener that may be used with a variety of material including, but not limited to frangible material, while at the same time being relatively cheap to produce.

SUMMARY OF THE INVENTION

The above needs are met, and the shortcomings of prior art are overcome by the fastener of the invention. In one embodiment, a metal fastener includes a metal shank having an approximately constant diameter, a helical threading formed on the shank, wherein the ratio of the thread diameter to the shank diameter is at least 1.5:1 and the helical thread is spaced at intervals of between 0.5 to 1.0 cm. The fastener may include a second helical threading formed on the shank proximal the head and distal the tip, the second threading having a second diameter that is substantially less than the first diameter.

In another embodiment, a method of forming a metal fastener includes the steps of providing a metal shank having a head at a first end and forming a helical thread and an uneven surface between successive convolutions of the thread by rolling, wherein the ratio of the thread diameter to the shank diameter is at least 1.5:1 and the pitch is between 0.5 and 1.0 cm. In this method, there may also be the additional step of forming, on the shank, a second thread proximate the head.

In another embodiment, a method for supporting a structure from frangible material using a fastener includes the steps of providing a self-tapping metal fastener including a head and shank, the shank having a minor diameter and a major diameter, the major diameter defined by a helical threading formed on the shank, wherein the ratio of the major diameter to the minor diameter is at least 1.5:1, and driving the fastener into the frangible material such that the fastener and structure is supported entirely by the frangible material and wherein the frangible material is each of sheet rock and masonry material. The masonry material may be any of concrete, brick and block material.

Additional features and advantages of the invention will be set forth or be apparent from the description that follows. The features and advantages of the invention will be realized and attained by the structures and methods particularly pointed out in the written description and claims hereof as well as the appended drawings.

It is to be understood that both the foregoing general description and the following detailed description are exemplary and explanatory and are intended to provide further explanation without limiting the scope of the invention as claimed.

BRIEF DESCRIPTION OF THE DRAWINGS

The accompanying drawings, which are included to provide a further understanding of the invention, are incorporated in and constitute a part of this specification, illustrate preferred embodiments of the invention and together with the description serve to explain the principles of the invention. In the drawings.

DETAILED DESCRIPTION OF THE PREFERRED EMBODIMENTS

Figure 1:
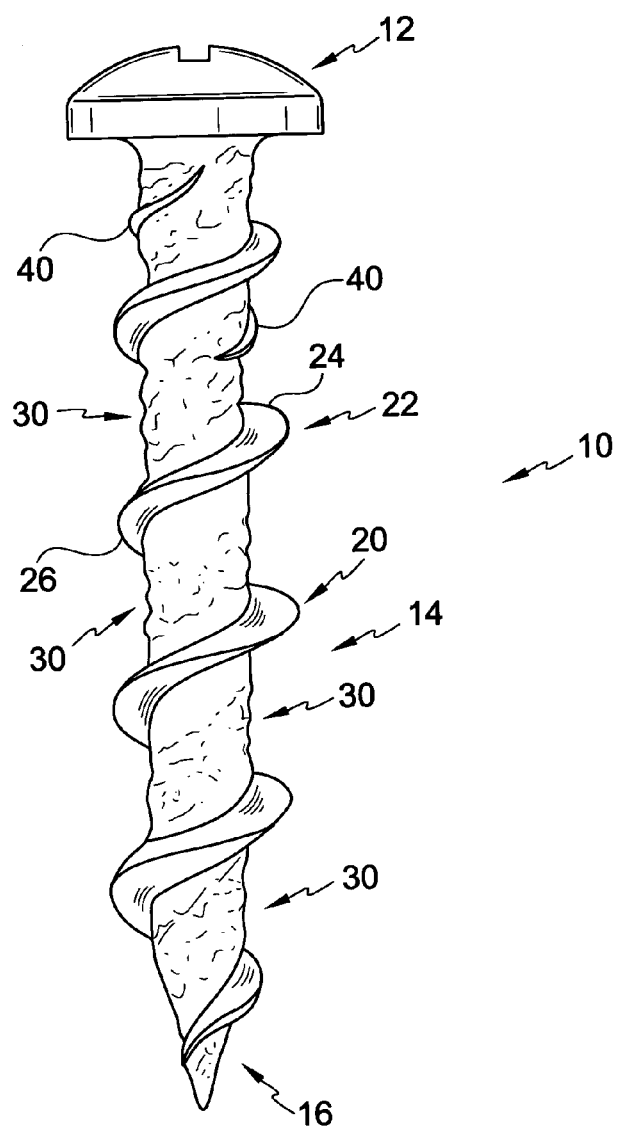
FIG. 1 is a side view of a drywall fastener incorporating the principles of invention.

According to the fastener of the invention, a metal shank includes one or more threads having a coarse pitch and large ratio of minor to major diameters. The fastener may be securely held in a variety of materials, including but not limited to sheet rock (Blaster Board), wood, concrete, brick, block, and Gas Beton or Light Weight Concrete. Additionally, the fastener design is such that the it may be removed from the material without causing excessive damage to the wall or surface.

In the case of sheet rock or other types of frangible and relatively weak material, the fastener's holding power in the material is such that loads applied to the fastener may be reacted solely by the sheet rock, without also securing the fastener with the assistance of a stud or other relatively high-strength material associated with a wall. Thus, the fastener according to the invention may be used to support objects on a wall by relying entirely upon the sheet rock which forms the wall, which is particularly advantageous in situations when a support fastener is needed in areas where no stud is available. The fastener also provides the benefits of forming a relatively small bore in the wall, thereby minimizing damage to a wall. The fastener shank may also include an uneven, or roughened helical surface extending over the shank surface defined by the minor diameter. This roughened surface may be useful for increasing the frictional hold between the sheet rock and fastener, thereby resisting pull-out. The fastener may also include a secondary threading that extends over at least over a portion of the shank proximate the head. The coarse thread pitch and relatively large ratio of major to minor diameters (as compared to the typical metal screw) is effective in engaging a large amount of material between threads. The fastener has suitable strength for effective use with materials like concrete, block or brick, in addition to sheet rock applications. In these applications, the fastener is inserted into a pre-bored hole and traps material dislodged from the hole (when the fastener is inserted) to achieve a firm hold. In these applications, a roughened or uneven surface between the threads may be formed on the shank, which can provide frictional resistance to pull-out. The fastener may also be used in fibrous material, such as wood, in addition to frangible material.

As noted above, the fastener is intended for providing a secure hold in frangible material, whether it be sheet rock or masonry material, by providing a space between threads for trapping a large amount of material due to its relatively large ratio of major to minor diameters and/or coarse pitch. In the preferred embodiments, a metal shank is used which has a ratio of the major to minor diameters, and independently thereof the ratio of the major diameter to the pitch, that is preferably at least about 1.5:1, more preferably at least about 1.75:1, and most preferably about 2:1 or more. The pitch may be approximately five threads per inch or less, such as four threads per inch.

Figure 2:
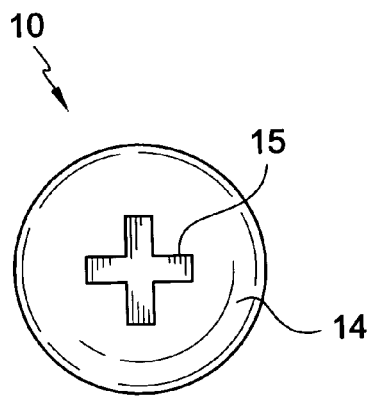
FIG. 2 is a top view of the drywall fastener of FIG. 1.
Figure 3:
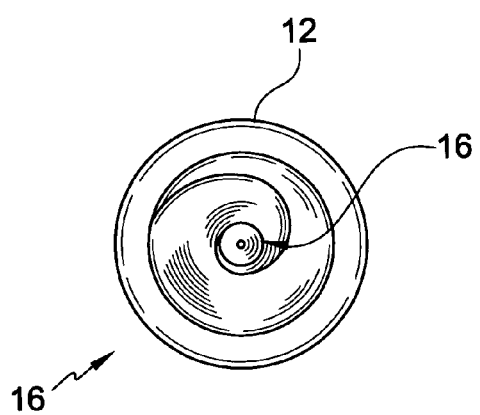
FIG. 3 is a bottom view of the drywall fastener of FIG. 1.

Referring to FIGS. 1 through 3, a preferred embodiment of a fastener 10 includes a head 12, shank 14, and pointed tip 16. In this embodiment, shank 14 has an approximately constant minor diameter over its length. A helical thread 20, which preferably extends over the length of shank 12 and terminates proximal the tip. The height of thread 20 is approximately constant over its length, with a slightly smaller height near tip 16. Head 12 may be formed with grooves 15 that allows it to be inserted with a screwdriver, e.g., a Phillips-head screwdriver. Head may alternatively be adapted to receive a flat head screw driver or a hex or square driver, or the head can be a hex head like a bolt, especially for hanging shelving and the like which are relatively heavy objects. Also, the head can be replaced with a hook or similar device.

Referring to the portion 22 of thread 20 labeled in FIG. 1, thread 20 is described by upper and lower chamfered surfaces 24 and 26, respectively, which may extend at approximately a 10 degree angle. A roughened surface 30 may also extend over shank 14. Surface 30 is characterized by various ridges, scores, bumps and/or valleys in contrast to the relatively smooth surfaces forming the threads. As illustrated, surface 30 is disposed between successive convolutions of thread 20 and may extend over a part of, or the length of the shank. A secondary threading may also be formed on shank 14. In the preferred embodiment, second thread 40 is formed proximal head 12 and makes an approximately 360 turn about shank. Thread 40 may also be formed so as to make a greater or less than 360 turn about the shank. The height of thread 40 is preferably substantially less than the height of thread 20.

In sheet rock or drywall applications, the advantages of the fastener of the invention over a conventional screw can be realized. In a conventional screw, the relatively fine threads (i.e., small ratio of major to minor diameters) and relatively dense pitch result in the portion of the wall engaged by the threads to be quite small in relation to the size of the bore. Thus, there is little holding strength in the wall. In contrast, the amount of material engaged by the threads of fastener 10 are substantial in relation to the size of the bore. By engaging a larger amount of material with the threads, a more secure holding power in the material is achieved. By making the fastener of metal, the same fastener may also be inserted into concrete or other relatively hard material. In concrete, brick or block applications, a hole is formed in the material that is approximately the diameter of the shank minor diameter. The fastener is then inserted into the hole with the threads forming helical grooves in the hole. As the fastener is driven into the hole, e.g., with a driving tool, material breaks off of the wall and becomes trapped between the threads.

In a method of manufacture of a metal fastener according to the invention, a threading is preferably formed by a cold-rolling rolling process. According to this method, the shank of the drywall fastener is rolled between two thread-forming dies, thereby producing the thread the fastener thread may alternatively be formed by a casting process, or via a lathe. In a preferred embodiment, the rolling process forms a thread having an upper and lower chamfered surface, such as surfaces 24 and 26 of fastener 10 which together form thread 20. The rolling process may also be relied upon to create roughened surface 30 as a result of, e.g., flaking. As material is squeezed between the dies during thread formation, material will not flow uniformly. This results in an uneven or roughened surface between the thread formations. The effect of this non-uniform material flow is particularly evident in the fastener of the invention which, when manufactured by a rolling process, results in the uneven or roughened surface between thread formations. Other methods known in the art may be utilized to create a roughened or uneven surface between the threads without departing from the scope of the invention.

Preferably, a counter-rotating die is positioned near head 12 to form second thread 40, which extends approximately 360 degrees about shank 12. The forming of second thread 40 may be useful to prevent the upper portion of shank 12, proximate head 12, from being bent as a result of the forces required to form the coarse thread pitch and/or high major/minor diameter ratio when a rolling process is employed. In a preferred embodiment, a counter-rotating, e.g., thread-forming die, may be used to react any tendency of the upper end of shank 14 to bend while thread 20 is formed. The depth of thread 40 need not be of any significant amount and can amount to a relatively insignificant thread depth having no significant fastening ability. Second thread 40 may also extend over less or more than 360 degrees, depending on needs.

Although the foregoing description is directed to the preferred embodiments of the invention, it is noted that other variations and modifications will be apparent to those skilled in the art, and may be made without departing from the spirit or scope of the invention.

What is claimed is:

1. A fastener, comprising:
 a metal shank having a tip and an approximately constant diameter except at its tip;
 a first helical thread formed on the shank and having a first diameter, wherein the ratio of the first diameter to the shank diameter is at least 1.5:1;
 a second helical thread formed on the shank and having a second diameter that is substantially less than the first diameter; and
 a helical, roughened surface formed on the entire shank.

2. The fastener of claim 1, wherein the first helical thread is spaced at intervals between 0.5–1.0 cm.

3. The fastener of claim 1, further comprising a head at one end of the shank and the tip being pointed at a second end of the shank distal the head.

4. The fastener of claim 3, wherein the head includes grooves adapted to engage a Phillips-head screwdriver.

5. The fastener of claim 3, further comprising the second helical thread formed on the shank proximal the head and distal the tip.

6. A fastener comprising
 a head;
 a shank having a minor diameter and a tip;
 a first helical threading formed on the shank and having a first diameter, wherein the ratio of the first diameter to the minor diameter is at least 1.5:1 and the threads of the first threading are spaced at intervals between 0.5 to 1.0 cm;
 a second helical threading formed on the shank proximal the head and distal the tip, the second threading having a second diameter that is substantially less than the first diameter; and a helical, roughened surface extending over the entire shank.

7. A fastener, comprising:

a head;

a shank having a minor diameter, a tip, and a length extending from the head to the tip;

a first helical threading formed on the shank and having a first diameter, the ratio of the first diameter to the minor diameter is at least 1.5:1;

a second helical threading formed on the shank proximal the head and distal the tip, the second threading having a second diameter that is substantially less than the first diameter; and a helical, roughened surface formed on the entire shank, wherein the second helical threading extends over less than half of the shank length.

8. A method for supporting a structure from frangible material using a fastener, comprising the steps of:

providing a self-tapping fastener including a head and shank, the shank having a tip and a minor diameter and a major diameter, the major diameter defined by a first helical threading formed on the shank, wherein the ratio of the major diameter to the minor diameter is at least 1.5:1, a second helical threading formed on the shank, the second threading having a second diameter that is substantially less than the major diameter, and a helical, roughened surface formed on the entire shank; and driving the fastener into the frangible material such that the fastener and the structure are supported entirely by the frangible material.

9. The method of claim 8, wherein the frangible material is selected from the group consisting of sheet rock, concrete, brick and block material.

* * * * *